United States Patent [19]

Drake et al.

[11] Patent Number: 4,467,327

[45] Date of Patent: Aug. 21, 1984

[54] ACTIVE MILLIMETER WAVE SIMULATOR FOR MISSILE SEEKER EVALUATIONS

[75] Inventors: Douglas C. Drake, Kent; Kenneth L. Wismer, Renton; Henry D. Ulrich, Sumner, all of Wash.

[73] Assignee: The Boeing Company, Seattle, Wash.

[21] Appl. No.: 304,640

[22] Filed: Sep. 22, 1981

[51] Int. Cl.³ .............................................. G01S 7/40
[52] U.S. Cl. ........................................ 343/17.7; 434/2
[58] Field of Search ............................ 343/17.7; 434/2

[56] References Cited

U.S. PATENT DOCUMENTS

| | | | |
|---|---|---|---|
| 3,153,770 | 10/1964 | Ferstman et al. | 434/6 |
| 3,277,476 | 10/1966 | Sabin | 343/5 SA |
| 3,323,123 | 5/1967 | Hegarty | 343/17.7 |
| 3,750,173 | 7/1973 | Tackman | 343/17.7 |
| 3,953,850 | 4/1976 | Redman | 343/17.7 |
| 3,955,199 | 5/1976 | Hutzelman et al. | 343/17.7 |
| 3,986,384 | 10/1976 | Giorgi | 73/1 F |
| 4,106,345 | 8/1978 | Saunders et al. | 73/432 SD |

Primary Examiner—Maynard R. Wilbur
Assistant Examiner—M. R. Gordon
Attorney, Agent, or Firm—Finnegan, Henderson, Farabow, Garrett & Dunner

[57] ABSTRACT

An active millimeter wave simulator for missile seeker evaluations wherein a missile seeker generates seeker signals and transmits them in the direction of an array of active antenna elements. Range timing signals are delayed in a time delay circuit to simulate a range between the missile seeker and a target. The seeker signals as received by the active antenna elements are supplied to a millimeter wave spectrum analyzer for determination of their frequency. A computer receives the determined frequency and controls a millimeter wave source to generate simulated target response signals with that same frequency but delayed in accordance with the time delay signal. The computer controls a master target control circuit to select a triad of antennas in the antenna array and to generate a phase center in the triad generating the target response signals. The millimeter wave spectrum analyzer further determines the frequency of the target response signals. The computer compares the frequencies of the target response signals and the missile seeker signals and controls the millimeter wave source to ensure correspondence between those frequencies.

11 Claims, 4 Drawing Figures

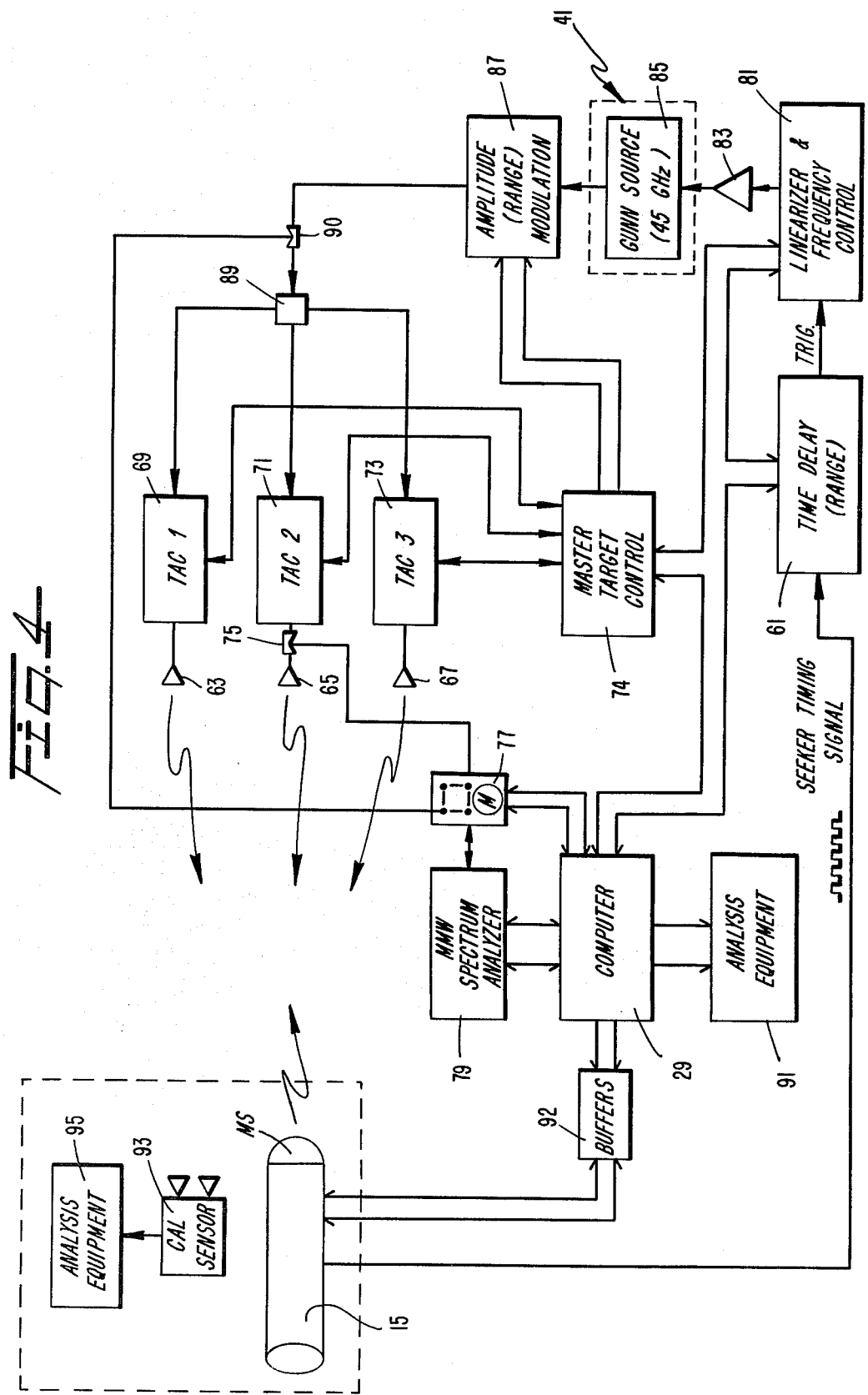

ACTIVE MILLIMETER WAVE SIMULATOR FOR MISSILE SEEKER EVALUATIONS

FIELD OF THE INVENTION

This invention relates with particularity to a simulation system for use with a dual mode missile seeker.

BACKGROUND OF THE INVENTION

The increasing level of sophistication in both computer software and computer hardware has found particular application in the test and measurements field. In particular, computer simulation enables the evaluation of devices and processes in a simulated real-time mode. There are numerous advantages to such active mode test devices. First, once the computer hardware is established and the software developed, it is possible to test equipment and processes under a wide variety of real-time conditions. This leads to a very cost effective testing system because it makes unnecessary the need to duplicate environmental conditions to test hardware malfunctions.

The use of computer simulation also significantly decreases the amount of time necessary to conduct tests of devices and processes. Since it is common to assemble a computer simulation chamber within the laboratory, tests can be run much more quickly than if there was a need to conduct the tests under actual environmental conditions.

Also, computer simulation facilitates frequent testing and permits a design to be repeatedly tested and modified before assembling a working prototype of the device for actual test purposes. This can significantly shorten design and development times.

Computer simulation has found important application in the development and testing of missile seekers. It is far easier and more efficient to test in a laboratory the response of a new seeker design to various simulated conditions instead of having to acquire a test site and evaluate the seeker under actual flight conditions.

In the past, two types of missile seekers have evolved. They are the passive, e.g., infrared and optical, and active such as radar or microwave.

Passive millimeter wave seekers derive their target and guidance data from contrast differences between a target and its surrounding background due to variations in thermodynamic temperature (emissivity relationship) and reflectivity (sky temperature). This can be expressed by the following equation:

$$T_R = eT_T + pT_{SKY}$$

where
- $T_R$ = The radiometric temperature (K) of the target or background at the frequency of the millimeter wave seeker.
- $e$ = The emissivity of the target or surrounding background terrain at the seeker's operating frequency.
- $T_T$ = The thermodynamic temperature of the target and surrounding terrain (K).
- $p$ = The reflectivity of the target and the background at the seeker frequency.
- $T_{SKY}$ = The sky temperature (K) at the seeker frequency.

Active millimeter wave seekers use radar techniques for their guidance, i.e., transmit a specific waveform and frequency and home on the energy reflected from the target and the surrounding background.

Each of the active and passive missile seekers has its advantages. For instance, active seekers provide very good target resolution at long distances. At close range, however, radar and other types of active seekers suffer a well-known problem in the art called glint.

Passive seekers also have long range application but, perhaps more importantly, do not exhibit glint at close range. Accordingly, it has become desirable in some applications to provide a dual mode missile seeker which incorporates both passive and active seekers on the same missile.

Such dual mode seekers, however, have given rise to a host of questions resolvable only through testing and design optimization of the seekers. These questions include the likelihood of interference between the active and passive missile seekers, the compatability of different designs of active and passive seekers, and the optimal way of interfacing the two seekers.

It has been known to employ anechoic radar simulators to provide real-time simulations for active missile seekers. Anechoic radar simulators cannot, however, provide passive millimeter wave real-time simulation because of the high emissivity characteristics of the anechoic material and the resulting high thermodynamic temperatures which mask the passive seeker under evaluation. Accordingly, a passive/active (dual mode) millimeter wave seeker cannot be evaluated in an anechoic chamber.

A simulation facility for dynamically testing guidance systems which use radio frequencies is disclosed in U.S. Pat. No. 4,106,345 issued to Saunders et al. on Aug. 15, 1978. This patent is assigned to the assignee of the instant invention.

The Saunders et al. simulation facility enables the testing of passive seekers in the radiometric frequency band comprising generally the millimeter and microwave frequency ranges covering from 18 GHz to 350 GHz. The simulator facility includes a chamber having interior walls lined with a reflective material having a very low emissivity coefficient, such as aluminum foil. A portion of the ceiling of the chamber is open to the sky and a 45° sloping surface is provided beneath the ceiling opening. An array of dynamically controlled noise sources is arranged within the chamber, and, when energized, emit energy at radiometric frequencies to simulate the radiometric appearance of terrain and selected objects and targets. A passive seeker is provided in the sloping surface such that radiometric energy emitted by the array not captured by the passive seeker is reflected off of the sloping surface and through the ceiling opening to the sky.

An attempt to employ this facility to support dual mode seeker simulation when anechoic material was placed in the aluminum foil lined chamber failed because the ambient radiometric temperature (energy) of the chamber was increased to an unworkable level.

OBJECTS AND SUMMARY OF THE INVENTION

It is, therefore, an object of the present invention to enable the simulation of both an active and a passive missile seeker within the same simulation facility.

Another object of this invention is to provide a missile seeker simulation facility whereby target range, target position, and target movement can be simulated.

Still another object of this invention is to generate signals simulating reflections of radiometric energy off of a target to enable the testing of an active missile seeker.

Another object of this invention is to eliminate increases in the ambient radiometric temperature of a simulation chamber when anechoic material is placed therein.

These and other objects are accomplished by a simulator adapted for active mode missile seeker target tracking evaluations wherein a missile seeker generates seeker signals having characteristic frequencies and a seeker timer signal associated with a seeker signal, the simulator comprising means for selectively delaying the seeker timer signals to simulate a range between the missile and the target; means for generating target response signals having characteristic frequencies simulating reflections of the seeker signals from the target; means for determining the difference between the characteristic frequencies of the seeker signals and the target response signals and for generating an output signal associated with the determined differences; control means responsive to the delayed seeker timer signals and the output signal from the generating means to generate the target response signals having frequencies corresponding to the frequencies of the seeker signals and amplitudes corresponding to the simulated range from the missile to the target; and means for supporting the missile seeker in the path of the target response signals and for reflecting from the simulator any target response signals not received by the missile seeker.

BRIEF DESCRIPTION OF THE DRAWINGS

The accompanying drawings which are incorporated in and constitute a part of the specification, illustrate an embodiment of the invention and, together with the description, serve to explain the principles of the invention.

FIG. 4 is a block diagram of the control system for the dual mode simulation system of the instant invention.

DETAILED DESCRIPTION OF THE PREFERRED EMBODIMENT

Figure 1:
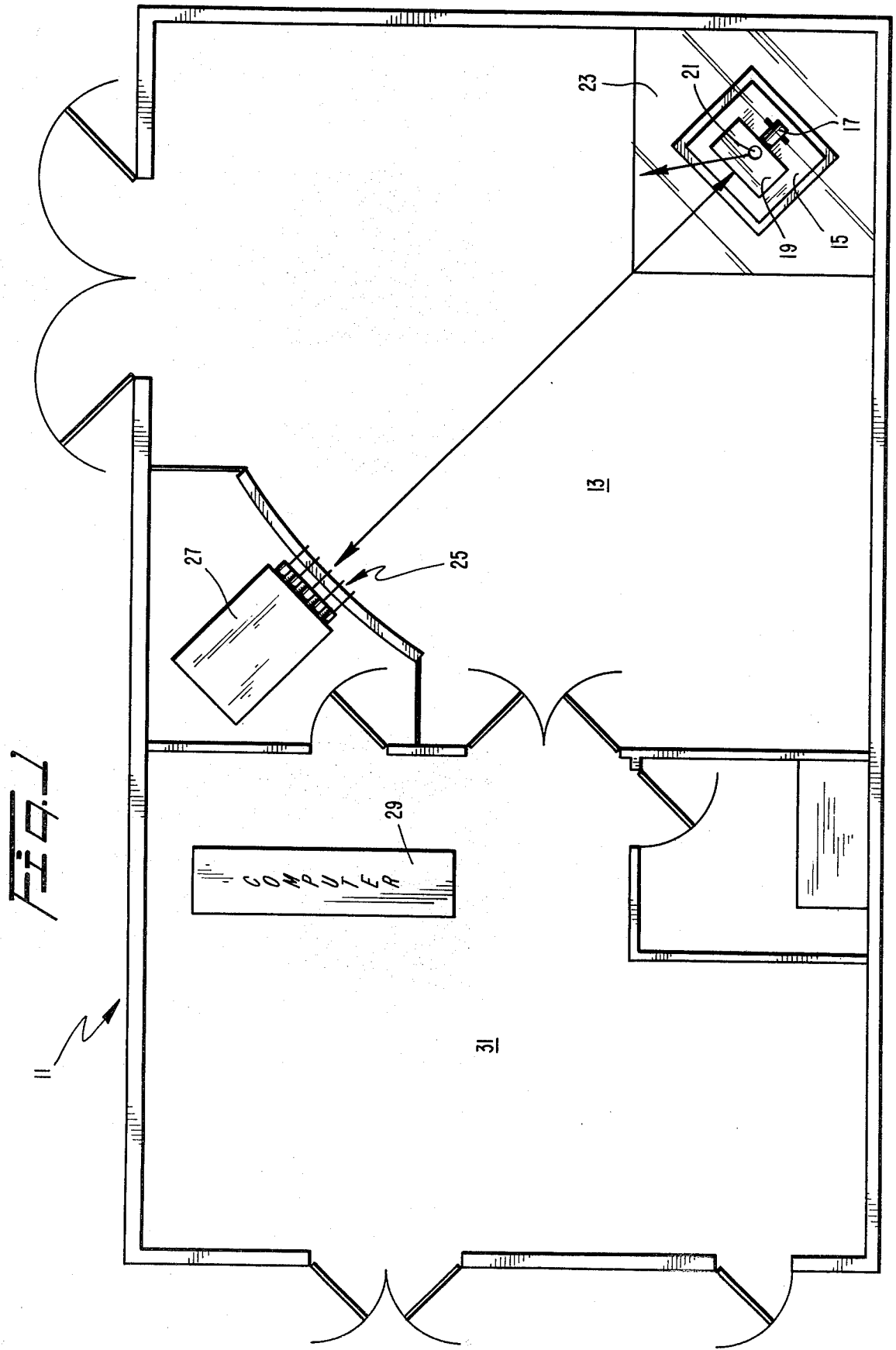
FIG. 1 is a schematic representation of the simulation facility of the present invention.

FIG. 1 schematically illustrates a simulation facility incorporating the dual mode simulator system of the instant invention. Facility 11 includes a simulation chamber 13. In one corner of the chamber 13 is provided a flight table 15. Mounted on the flight table 15 are a missile 17 and a sloping surface 19. The seeker of the missile 17 protrudes through an aperture 21 in the sloping surface 19. A large window 23 is provided above the flight table 15 for access to the sky. The window 23 is utilized as a radiometric signal sink for the simulation system.

The flight table 15 comprises means for supporting the missile seeker in the path of target response signals. The source of the target response signals will be hereinafter discussed. The sloping surface 19 comprises means for reflecting from the simulator any target response signals that are not incident upon the seeker of the missile 17.

The structure of the simulation chamber 13 is discussed in the previously referenced Saunders et al. patent. Such chamber is also suitable for practicing the instant invention with the modifications described below.

The flight table 15 is adjustable in three directions under the control of the simulation system to simulate roll, pitch, and yaw. The sloping surface 19 has a reflective surface comprised, for example, of aluminum foil.

The seeker of the missile 17 generates seeker signals and radiates them towards means for generating target response signals having characteristic frequencies simulating reflections of the seeker signals from a simulated target. As embodied herein, the generating means comprises an array 25 of active antenna elements and an electronics unit 27 for controlling the antenna array 25 in conjunction with a computer 29 located within the control section 31.

Figure 2:
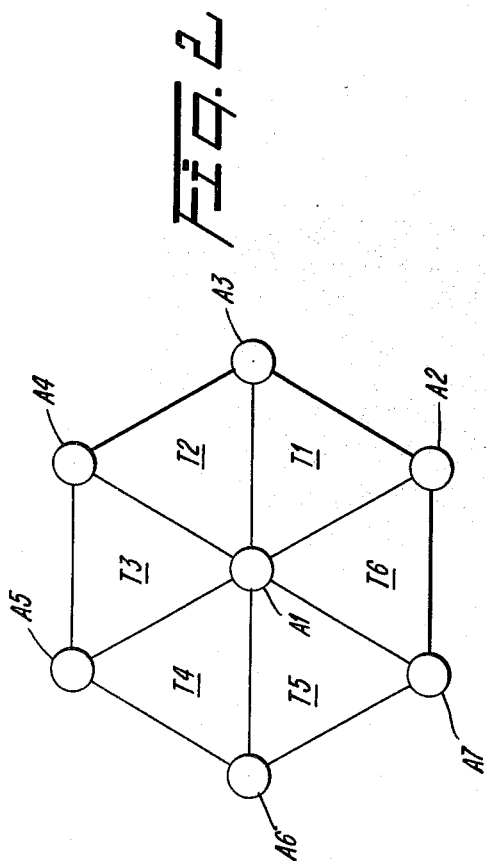
FIG. 2 is a schematic representation of an array of active millimeter wave antennas.

FIG. 2 illustrates the array 25 of active antenna elements. The array 25 comprises antennas A1-A7 arranged in the manner illustrated in FIG. 2. This arrangement of antenna elements forms six triads T1-T6. As will hereinafter be explained, a master target control unit selectively energizes three of the antenna elements A1-A7 which form one of the triads T1-T6 to simulate a target. By selecting and energizing different triads of antennas in succession, the simulated target is moved around the array 25.

The antenna elements A1-A7 generate the previously discussed target response signals which are interpreted by the seeker of a missile 17 to be reflections of the seeker signals generated by the missile seeker.

The master target control circuit (FIG. 4) selectively energizes three of the antenna units A1-A7 in accordance with a triad equation to control the energy emitted by the selected antenna elements. The master target control also controls the amplitude and phase relationship between the three selected antennas to create what is known in the art as a phase center, i.e., a point from which the response signals are interpreted to emanate. If for example, the master target control selects antenna elements A1, A3, and A4 (defining the triad T2) and supplies these antenna elements with signals of common amplitude and phase, the phase center would appear to be in the center of the triad T2. That phase center is interpreted by the seeker of the missile 17 to be a reflection of a seeker signal from a target.

If the relative phase or amplitude of three selected antennas is changed to be unequal or if different antenna elements are chosen, the phase center of the apparent target will be displaced within the antenna array 25. Thus, the master target control can selectively move the phase center throughout the antenna array 25 to simulate movement of a target or flight corrections of the seeker.

Figure 3:
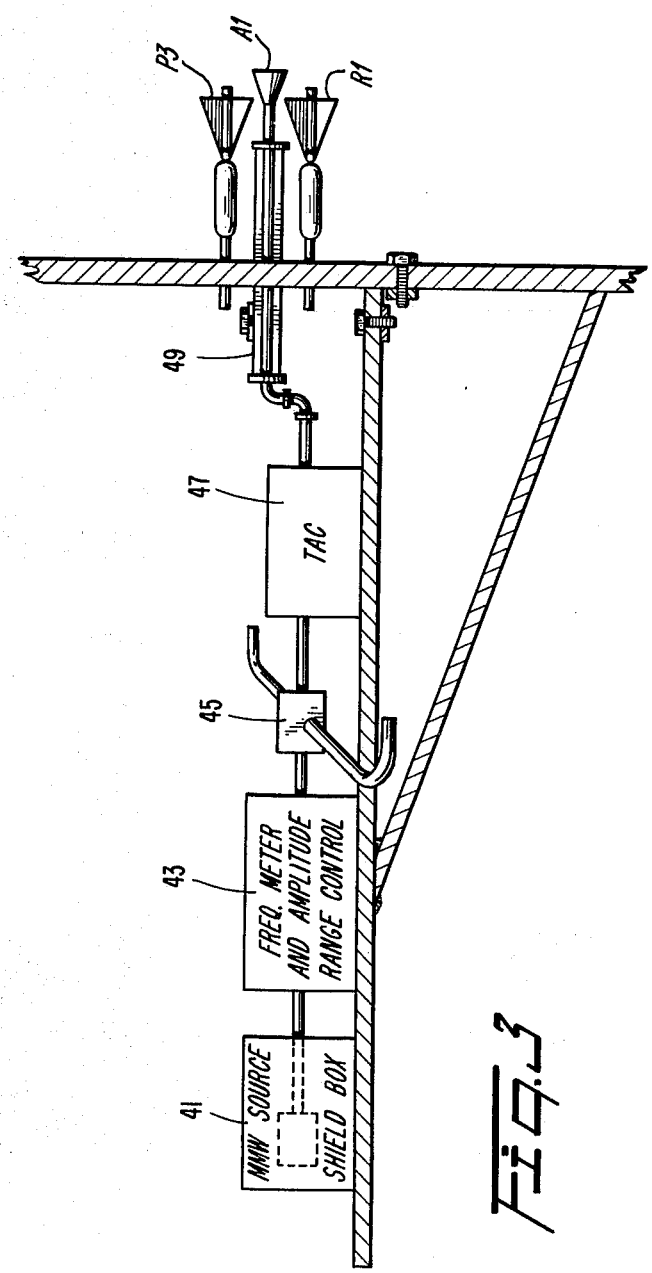
FIG. 3 is a schematic illustration of a portion of the active and passive millimeter wave antennas of the instant invention.

FIG. 3 is a cross-sectional view of the antenna array 25 and the antenna control circuit 27. As embodied herein, the antenna control circuit includes a millimeter wave source 41 coupled to a frequency meter and amplitude range control circuit 43. The output of the frequency meter and amplitude range control circuit 43 is supplied to a power divider 45. The power divider 45 is coupled to each target antenna control (TAC) circuit 47 associated with each of the antenna elements in the antenna array 25. For example, in FIG. 3, the target antenna control circuit 47 is coupled to the antenna element A1. The antenna element A1 is mounted in a brass mounting tube 49.

As will be explained in conjunction with the simulation control circuit of FIG. 4, the millimeter wave source 41 generates the target response signals (simulated seeker signal reflections) with a frequency corresponding to the frequency of the seeker signals generated by the seeker of the missile 17. The frequency meter and amplitude range control circuit 43 controls the amplitude of the response signals to simulate a selected range between a target and the missile seeker by selectively attenuating the response signals. The power divider 45 is connected to each of the target antenna control circuits. The power divider 45 supplies the amplitude adjusted response signals to the antenna elements selected by the master target control. A suitable antenna element is the well-known cone-shaped antenna.

FIG. 4 illustrates the simulation control circuit for use in the instant simulation system. The missile 15, as previously discussed, includes a missile seeker MS for generating a seeker signal having a characteristic frequency. A suitable seeker signal is a radar signal having a selected pulse frequency.

The missile 15, as is known in the art, generates seeker timing signals which are employed to determine the length of time for a seeker signal pulse to travel to an object, to be reflected by that object, and to return to the missile seeker MS. Range information can be determined by counting the number of seeker timing signals which occur between the transmission and reception of each of the seeker signal pulses.

In the instant simulation system, the seeker timing signals are supplied to means for delaying the seeker timer signals to simulate a range between the missile and the simulated target. As embodied herein, the delaying means comprises a digital delay line, for example, incorporated within a time delay circuit 61. The time delay circuit 61 is controlled by the computer 29 to delay the generation of the trigger signal TRIG for a selected time period. Obviously, the time delay circuit 61 delays the generation of the TRIG signal for a longer time period when a greater range is being simulated than when a lesser range between the missile and the simulated target.

As illustrated in FIG. 4, the antenna array 25 comprises antenna elements 63, 65, and 67 coupled to target antenna controls 69, 71, and 73, respectively. The antenna elements 63, 65, and 67 receive the seeker signals generated by the missile seeker MS as well as transmit the target response signals.

A directional coupler 75 is connected between the output of antenna unit 65 and the target antenna control circuit 71. The directional coupler 75 senses the frequency of the seeker signals as received by the antenna 65 and supplies them to a switch 77. This enables the simulation system to determine the frequency of the seeker signal and to generate response signals matched to that frequency.

The switch 77 is connected to a millimeter wave spectrum analyzer circuit 79. A suitable millimeter wave spectrum analyzer circuit is the model 492 Spectrum Analyzer marketed by Tektronix Corporation. The millimeter wave spectrum analyzer 79 receives the seeker signals from the directional coupler 75 through the switch 77 and determines the frequency thereof. The determined frequency is supplied to the computer 29.

The computer 29 is coupled to the time delay circuit 61, a master target control circuit 74, and a linearizer and frequency control circuit 81. In response to receiving the determined frequency of the seeker signal, the computer 29 generates an appropriate control signal for controlling the time delay circuit 61 to delay the generation of the TRIG signal for a period corresponding to a selected range to be simulated.

The computer 29 also generates the signal for controlling the linearizer and frequency control circuit 81 to generate a driving voltage. The signal level of the driving voltage corresponds to the determined frequency of the seeker signals. Also, the computer 29 generates appropriate control signals for controlling the master target control circuit 74 to select target antenna control circuits within the antenna array corresponding to the triad of antenna units chosen to transmit the target response signals.

The linearizer and frequency control circuit 81 upon receiving the TRIG signal from the time delay circuit 61 and the appropriate control signals from the computer 29, supplies a voltage signal to driver circuit 83. The driver circuit 83 in turn controls a millimeter wave source 41 comprising, for example, a Gunn signal source 85.

As is well-known in the art, it is common for the missile seekers to frequency modulate the seeker signals around a certain center frequency. For instance, the seeker signals may vary ±10 MHz from a particular center frequency. The voltage driver signal outputted from the linearizer and frequency control circuit 81 varies in peak value to modulate the frequency output of the Gunn source 85. Thus, the output of the Gunn source 85 simulates the reflections of the seeker signals from a target.

The target response signals generated by the Gunn source 85 are supplied to an amplitude modulation circuit 87. The amplitude modulation circuit is controlled by the master target control circuit 74 and changes the amplitude of the target response signals in accordance with the range selected by the computer 29. Thus, the amplitude of target response signals simulating a distant target will be less than the amplitude of target response signals simulating a lesser range between the missile 15 and the simulated target.

The target response signals are supplied by the amplitude modulation circuit 87 to a manifold or power divider circuit 89. This power divider circuit 89 supplies the target response signals to each of the target antenna control circuits associated with the array of antenna 25 elements. Nonetheless, it is only those target antenna control circuits selected by the master target control 74 to comprise a specific triad that will transmit the target response signals through the associated antenna elements.

A second directional coupler 90 coupled between the amplitude modulation circuit 87 and the power divider 89 supplies the target response signals to the second input of the switch 77. Under the control of the computer 29, the switch 77 selectively supplies either the target response signals or the seeker signals to the millimeter wave spectrum analyzer 79. As described above, the spectrum analyzer 79 is capable of determining the frequency of the seeker signals. The spectrum analyzer 79 further determines the frequency of the target response signals and supplies that determined frequency to the computer 29.

The computer 29 compares the determined frequency of the seeker signals to the determined frequency of the target response signals. If the compared frequencies are unequal, the computer 29 controls the linearizer and frequency control circuit 81 to generate a different driving voltage for controlling the Gunn source 85 to generate target response signals with the proper frequency, i.e., the frequency of the seeker signals.

The simulation system further includes an analysis equipment module 91 coupled to the computer 29 and a set of data buffers 92 connected between the missile 15 and the computer 29. The buffers 92 are bidirectional to enable the transfer of data and control signals between the missile 15 and the computer 29.

As is understood in the art, the target response signals received by the missile seeker MS are supplied to the autopilot (not shown) of the missile 15. The autopilot generates appropriate control signals for controlling the directional fins (not shown) of the missile 15 to align the line of sight of the missile 15 to the determined location of the target. The buffers 92 and the bidirectional communication lines connecting the buffers 92 to the missile 15 and the computer 29 enable the computer to receive the signals generated by the autopilot.

The signals are supplied to the analysis equipment module 91 to determine whether the missile seeker and autopilot are generating the proper flight control signals. Since the computer 29 controls the phase center of the target response signals within the antenna array, it is capable of supplying to the analysis equipment module 91 sufficient information to determine whether the missile seeker and autopilot of the missile 15 are responding correctly to changes in the phase center of the antenna array 25.

A set of calibration sensors 93 and an associated analysis equipment module 95 are shown in conjunction with the missile 15. The calibration sensors 93 and the analysis equipment module 95 are used to select the initial orientation of the flight table 17 and testing of the simulation system.

In operation, the missile seeker MS generates seeker signals having a characteristic modulated frequency. The missile 15 further generates seeker timing signals used in determining the range of a target from the missile. The seeker signals are captured by antenna 65 and supplied by directional coupler 75 to the switch 77. Under the control of the computer 29, the seeker signals are gated through the switch 77 to the millimeter wave spectrum analyzer 79. The millimeter wave spectrum analyzer 79 determines the modulated frequency of the seeker signals.

The computer 29 controls the time delay circuit 61 in accordance with the range to be simulated and delays the transfer of the seeker timing signals to the linearizer and frequency control circuit 81 for a period associated with that range. The computer 29 also supplies the necessary control signals through the linearizer and frequency control circuit 81 to result in the generation of a driving voltage having a signal level corresponding to the frequency of the seeker signals. The computer 29 also selects, by means of the master target control circuit 74, target antenna control circuits which are to control their associated antenna units within a selected triad.

The linearizer and frequency control circuit 81 supplies the driving voltage to circuit driver 83. The output of the circuit driver 83 is connected to the Gunn source 85 which generates the target response signals at a frequency matched to the frequency of the seeker signals. Again, under control of the computer 29, the master target control circuit 74 controls the amplitude modulation circuit 87 to attenuate the amplitude of the target response signals generated by the Gunn source 85 in accordance with the target/missile range being simulated. The power divider circuit 89 supplies the amplitude modulated target response signals to the target antenna control circuits associated with the active antennas in the antenna array 25. The master target control circuit selects a triad of the antenna units in the array 25 to transmit the actual target response signals.

The target response signals are also transmitted by the second directional coupler to another input of the switch 77. The computer 29 controls the selection process of the switch 77 to alternately supply to the millimeter wave spectrum analyzer 79 the seeker signals and the target response signals. The millimeter wave spectrum analyzer 79 determines the frequencies of the seeker signals and the target response signals and supplies the determined frequencies to the computer 29. The computer 29 compares the frequency of the target response signal to the frequency of the seeker signals and adjusts the control input to the linearizer and frequency control circuit 81 to correct for any difference detected by the comparison.

In a closed loop mode of operation, the control signals generated by the missile seeker and the autopilot of the missile 15 are supplied by the buffers 92 to the computer 29. The computer 29, in turn, supplies them to the analysis equipment module 91 where it is determined whether the appropriate missile flight control signals are being generated to align the line of sight of the missile 15 to the position of the simulated target.

It will be further apparent to those skilled in the art that various modifications and variations can be made to the simulation system of the instant invention without departing from the scope or spirit of the invention and it is intended that the present invention cover the modifications and variations of the system provided that they come within the scope of the appended claims and their equivalents.

We claim:

1. In a passive simulator adapted for active mode missile seeker target tracking evaluations in real time wherein a missile seeker generates seeker signals having characteristic frequencies and a seeker timer signal associated with the seeker signals, an improvement comprising:

means for delaying said seeker timer signal to simulate a range between the missile and said target;

means for generating target response signals simulating the reflections of said seeker signals from said target;

means for determining the characteristic frequencies of said seeker signals and for generating an output signal corresponding thereto; and means responsive to said delayed seeker timer signal and said output signal for controlling said generating means to generate said target response signals having frequencies corresponding to the frequencies of said seeker signals and amplitudes corresponding to said simulated range from said missile to said target.

2. A simulator according to claim 1 wherein said target response signals are millimeter wave signals.

3. A simulator according to claim 2 wherein said generating means comprises:

a millimeter wave signal generator for generating said millimeter wave signals;

a plurality of antennas coupled to said signal generator; and means for selecting one or more of said antennas to transmit said millimeter wave signals.

4. A simulator according to claim 3 wherein said controlling means comprises:

a processor;

a frequency control circuit for controlling said millimeter wave signal generator to generate said millimeter wave signals with frequencies corresponding to said output signal of said determining means; and an amplitude control circuit for modulating said millimeter wave signals to have an amplitude simulating a selected range between said missile and said target.

5. A simulator according to claim 4 wherein said determining means comprises:

means for receiving said seeker signals; and means for analyzing said received seeker signals to determine the frequency thereof.

6. In a passive simulator adapted for active mode missile seeker target tracking evaluations in real time wherein a missile seeker generates seeker signals having characteristic frequencies and a seeker timer signal associated with the seeker signals, an improvement comprising:

means for selectively delaying said seeker timer signals to simulate the range between the missile and the target;

means for generating target response signals having characteristic frequencies simulating reflections of said seeker signals from said target;

means for determining the difference between the characteristic frequencies of said seeker signals and said target response signals and for generating an output signal associated with said determined differences;

control means responsive to said delay seeker timer signal and said output signal from said generating means to generate said target response signals having frequencies corresponding to the frequencies of said seeker signals and amplitudes corresponding to said simulated range from said missile to said target; and means for supporting said missile seeker in the path of said target response signals and for reflecting from said simulator any target response signals not received by said missile seeker.

7. A simulator according to claim 6 wherein said generating means comprises:

a millimeter wave source; and a plurality of antennas coupled to said millimeter wave source for selectively transmitting said millimeter waves and for receiving said seeker signals.

8. A simulator according to claim 7 wherein said determining and generating means comprises:

a spectrum analyzer circuit; and a switch coupled to one of said antennas and to said millimeter wave source for selectively supplying said seeker signals and said target response signals to said spectrum analyzer circuit, said spectrum analyzer circuit for generating a feedback signal corresponding to the differences and characteristic frequencies between said seeker signals and target response signals and for supplying said feedback signal to said millimeter wave source to control said source to adjust the characteristic frequencies of said target response signals to eliminate said frequency differences.

9. A simulator according to claim 8 wherein said control means comprises:

an amplitude control circuit coupled to said millimeter wave source for receiving said millimeter wave signals and for varying the amplitude thereof in accordance with the range to be simulated, said amplitude varying in direct proportion to the simulated range between the missile and the target;

a master target control circuit for selecting one or more of said antennas to generate said target response signals and for changing the antenna selected to simulate movement of the seeker during the tracking of the target; and a processor for controlling said master target control circuit, said delay means, and said switch to simulate the acquisition and tracking of the target by the seeker.

10. A simulator according to claim 9 wherein said supporting means comprises:

a flight table for supporting said seeker; and a planar surface angularly positioned in the path of said target response signals to reflect out of said simulator any target response signals incident upon said planar surface, said planar surface including an aperture for receiving said supported seeker to permit said seeker to receive said target response signals.

11. A simulator adapted for both active and passive mode missile seeker target tracking evaluations in real time wherein a missile seeker generates seeker signals having characteristic frequencies and a seeker timer signal associated with the seeker signals, the simulator comprising:

an anechoic chamber adapted for passive mode missile tracking evaluations;

means for selectively delaying said seeker timer signals to simulate the range between the missile and the target;

means for generating target response signals having characteristic frequencies simulating reflections of said seeker signals from said target;

means for determining the difference between the characteristic frequencies of said seeker signals and said target response signals and for generating an output signal associated with said determined differences;

control means responsive to said delay seeker timer signal and said output signal from said generating means to generate said target response signals having frequencies corresponding to the frequencies of said seeker signals and amplitudes corresponding to said simulated range from said missile to said target; and means for supporting said missile seeker in the path of said target response signals and for reflecting through an opening in said anechoic chamber away from said simulator any target response signals not received by said missile seeker.

* * * * *